(12) United States Patent
Takatsu et al.

(10) Patent No.: US 11,966,184 B2
(45) Date of Patent: Apr. 23, 2024

(54) IMAGE FORMING APPARATUS

(71) Applicant: CANON KABUSHIKI KAISHA, Tokyo (JP)

(72) Inventors: Junya Takatsu, Tokyo (JP); Junichi Hirota, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 17/673,300

(22) Filed: Feb. 16, 2022

(65) Prior Publication Data

US 2022/0269204 A1 Aug. 25, 2022

(30) Foreign Application Priority Data

Feb. 25, 2021 (JP) ................................. 2021-028713

(51) Int. Cl.
| | |
|---|---|
| G03G 15/00 | (2006.01) |
| H02K 1/2753 | (2022.01) |
| H02K 3/18 | (2006.01) |
| H02P 21/22 | (2016.01) |
| H02P 25/03 | (2016.01) |
| H02P 27/08 | (2006.01) |

(52) U.S. Cl.
CPC ......... *G03G 15/5008* (2013.01); *H02P 21/22* (2016.02); *H02P 25/03* (2016.02); *H02K 1/2753* (2013.01); *H02K 3/18* (2013.01); *H02P 27/08* (2013.01)

(58) Field of Classification Search
None
See application file for complete search history.

(56) References Cited

U.S. PATENT DOCUMENTS

| | | | |
|---|---|---|---|
| 2005/0041994 A1* | 2/2005 | Kameyama | ........ G03G 15/5008 |
| | | | 399/167 |
| 2015/0145454 A1 | 5/2015 | Kameyama | |
| 2015/0268614 A1* | 9/2015 | Kiyama | .................... F16H 7/02 |
| | | | 399/167 |

* cited by examiner

*Primary Examiner* — Roy Y Yi
(74) *Attorney, Agent, or Firm* — Canon U.S.A., Inc. I.P. Division

(57) ABSTRACT

One aspect is an image forming apparatus including a motor that drives a first member, a second member, a movement member that moves between a first position where the first and second members contact and a second position where the first and second members are separated, and a controller that receives an instruction to start a print job for forming an image on a recording medium, and executes an initial operation for determining a phase of a rotor of the motor in a stopping state of the rotor based on current flowing through a coil of the motor by supplying current to the coil in the stopping state in a state where the movement member is located at the first position, to control the current supplied to the coil to rotate the rotor in the stopping state based on the phase determined in the initial operation.

14 Claims, 10 Drawing Sheets

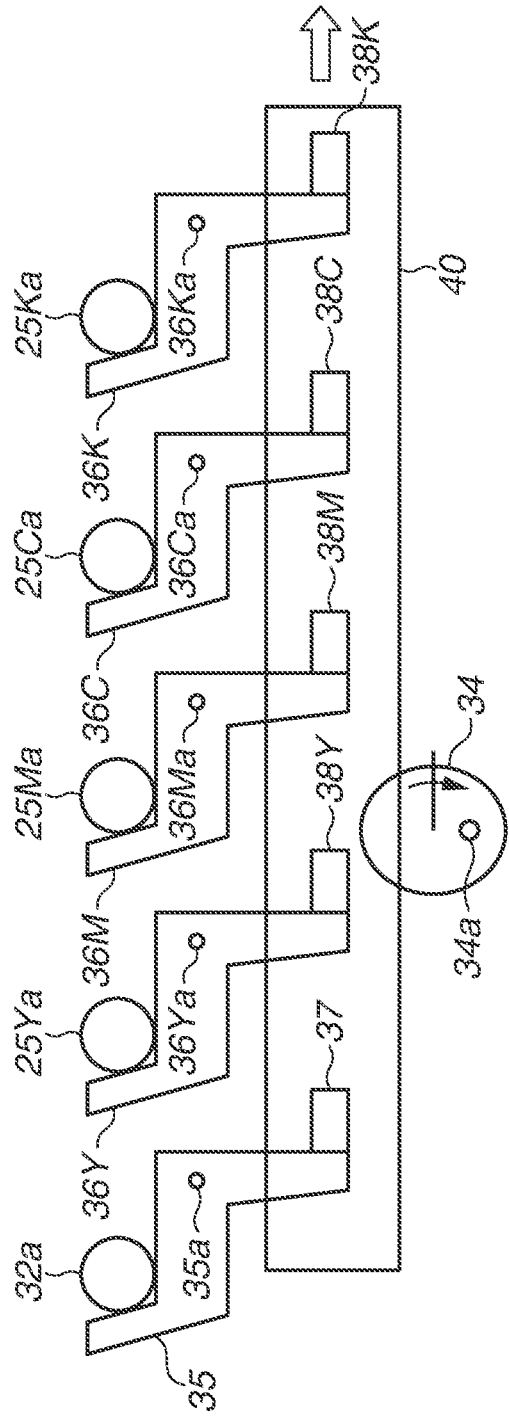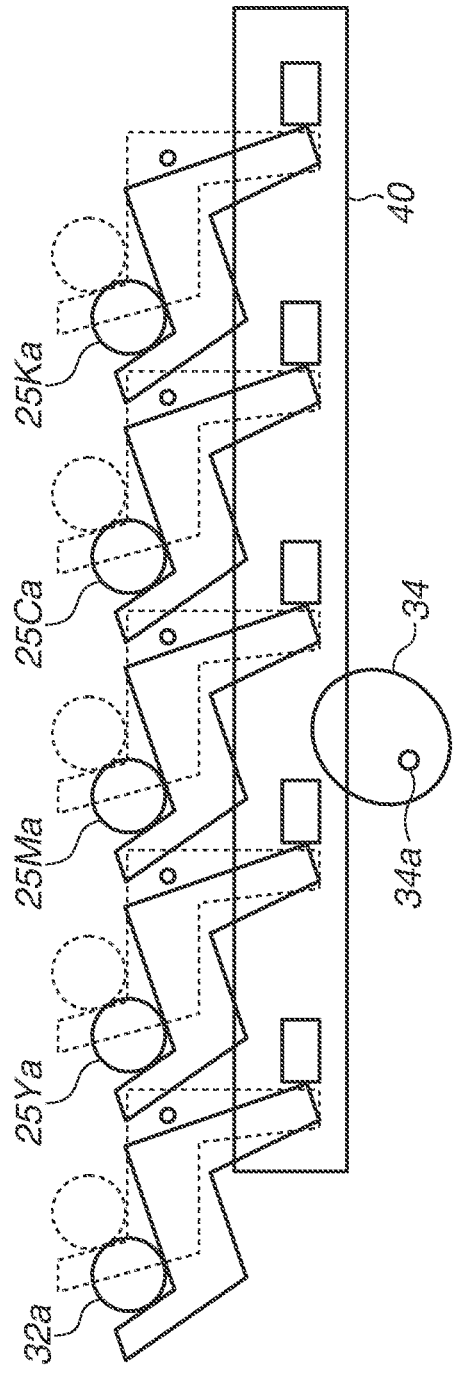

IMAGE FORMING APPARATUS

BACKGROUND OF THE DISCLOSURE

Field of the Disclosure

The present disclosure relates to a technique for controlling a motor in an image forming apparatus.

Description of the Related Art

It has been known that a brushless direct current (DC) motor is used as a motor for driving a load provided in an image forming apparatus. US 2015/0145454 discusses a technique for estimating a stopping position (initial position) of a rotor of a brushless DC motor using a variation of an inductance depending on the position of the rotor when the brushless DC motor is started. According to the technique discussed in US 2015/0145454, the initial position is estimated based on the responsiveness of current when a voltage is applied to a coil of the brushless DC motor, and driving of the brushless DC motor is started based on the estimated initial position.

In the initial position estimation method as discussed in US 2015/0145454, the brushless DC motor can vibrate when the rotor of the brushless DC motor is rotated due to the application of the voltage to the coil of the brushless DC motor, and this vibration can cause noise.

SUMMARY OF THE DISCLOSURE

Embodiments of the present disclosure provide for suppressing the vibration of a motor included in an image forming apparatus when the motor is started.

According to an aspect of the present disclosure, an image forming apparatus that forms an image on a recording medium includes a motor configured to drive a first member, a second member, a movement member configured to move between a first position and a second position, the first member and the second member being in contact with each other in a state where the movement member is located at the first position, the first member and the second member being separated from each other in a state where the movement member is located at the second position, and a controller configured to receive an instruction to start a print job for forming the image on the recording medium, the movement member moving from the second position to the first position based on reception of the instruction by the controller, to execute an initial operation in a state where the movement member is located at the first position, wherein in the initial operation, the controller determines a phase of a rotor of the motor in a stopping state where the rotor stops based on a current flowing through a coil of the motor by supplying the current to the coil of the motor in the stopping state, and to control the current supplied to the coil so that the rotor in the stopping state is rotated based on the phase determined in the initial operation.

Further features of the present disclosure will become apparent from the following description of exemplary embodiments with reference to the attached drawings.

BRIEF DESCRIPTION OF THE DRAWINGS

FIG. 2A illustrates a configuration for bringing a transfer belt into contact with photosensitive drums, and FIG. 2B illustrates a configuration for separating the transfer belt from the photosensitive drums.

DESCRIPTION OF THE EMBODIMENTS

Exemplary embodiments of the present disclosure will be described below with reference to the drawings. The shapes of components described in the exemplary embodiments, the relative arrangement of the components, and the like should be appropriately modified in accordance with the configuration of an apparatus to which the present disclosure is applied and various conditions, and the scope of the present disclosure is not limited to the following exemplary embodiments.

[Image Forming Apparatus]

Figure 1:
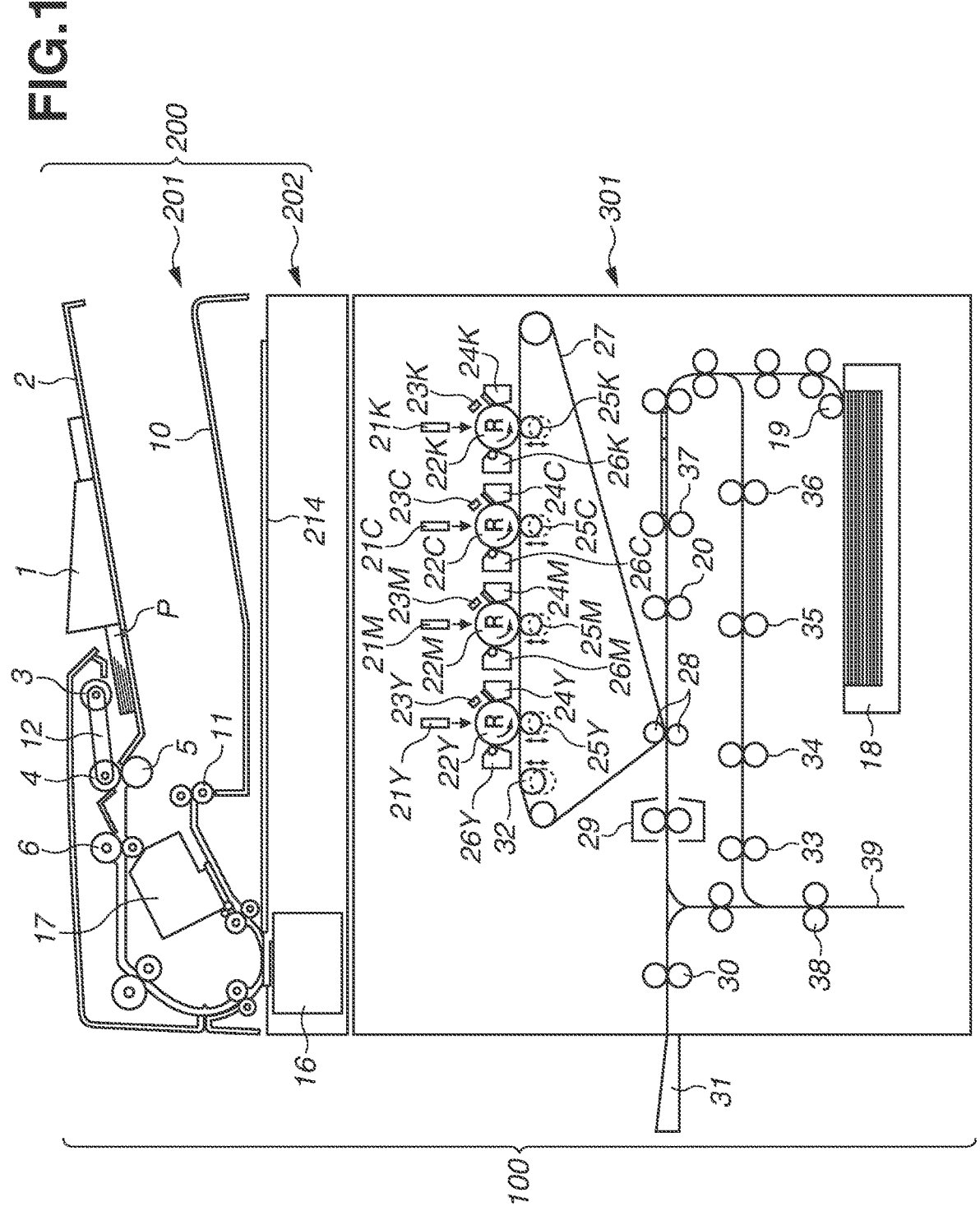
FIG. 1 is a sectional view illustrating an image forming apparatus according to a first exemplary embodiment.

FIG. 1 is a sectional view illustrating a configuration of a color electrophotographic copying machine (hereinafter referred to as an image forming apparatus) 100 that is used in a first exemplary embodiment. The image forming apparatus is not limited to a copying machine, but instead may be, for example, a facsimile apparatus, a printing machine, or a printer. A recording method is not limited to an electrophotographic method, but instead may be, for example, an inkjet method. The type of the image forming apparatus may be a monochromatic image forming apparatus type or a color image forming apparatus type.

A configuration and functions of the image forming apparatus 100 will be described below with reference to FIG. 1. As illustrated in FIG. 1, the image forming apparatus 100 includes a document reading apparatus 200 including a document feeding apparatus 201 and a reading apparatus 202, and an image printing apparatus 301.

<Document Reading Apparatus>

Documents P stacked on a document stacking unit 2 of the document feeding apparatus 201 are fed one by one by a pickup roller 3 and are further conveyed downstream by a feeding roller 4. A separation roller 5 that is in pressure contact with the feeding roller 4 is provided at a position opposing the feeding roller 4. The separation roller 5 is configured to rotate when a load torque greater than or equal to a predetermined torque is applied to the separation roller 5, and includes a function for separating two documents fed in an overlapping state.

The pickup roller 3 and the feeding roller 4 are connected with a swinging arm 12. The swinging arm 12 is supported by a rotation shaft of the feeding roller 4 so that the swinging arm 12 can pivot about the rotation shaft of the feeding roller 4.

Each document P is conveyed by the feeding roller 4 and the like and is discharged onto a discharge tray 10 by discharge rollers 11.

The reading apparatus 202 is provided with a document reading unit 16 that reads an image on a first surface of the conveyed document P. Image information read by the document reading unit 16 is output to the image printing apparatus 301.

The document feeding apparatus 201 is provided with a document reading unit 17 that reads an image on a second surface of the conveyed document P. Image information read by the document reading unit 17 is output to the image printing apparatus 301 in a similar manner to the method described for the document reading unit 16.

Document reading is performed as described above.

The document reading apparatus 200 has a first reading mode and a second reading mode as document reading modes. The first reading mode is a mode for reading an image on the conveyed document P by the method described above. The second reading mode is a mode for reading an image on a document placed on a document platen glass 214 of the reading apparatus 202 by the document reading unit 16 that moves at a constant speed. Typically, an image on a sheet-like document is read in the first reading mode, and an image on bound documents such as a book or a booklet is read in the second reading mode.

<Image Printing Apparatus>

A sheet storage tray 18 that stores a recording medium is provided in the image printing apparatus 301. On the recording medium, an image is formed by the image forming apparatus 100. Examples of the recording medium include a paper sheet, a resin sheet, a cloth, an overhead projector (OHP) sheet, and a label.

The recording medium stored in the sheet storage tray 18 is sent out by a pickup roller 19, and is delivered to registration rollers 20 by conveyance rollers.

A leading edge of the recording medium conveyed by a preregistration roller 37 contacts the registration rollers 20. As a result, a loop is formed between the registration rollers 20 and the preregistration roller 37, thereby correcting (reducing) the skew of the recording medium.

Respective color components of an image signal output from the document reading apparatus 200 are input to optical scanning devices 21Y, 21M, 21C, and 21K, each including a semiconductor laser and a polygon mirror. Specifically, the image signal for yellow output from the document reading apparatus 200 is input to the optical scanning device 21Y. The image signal for magenta output from the document reading apparatus 200 is input to the optical scanning device 21M. The image signal for cyan output from the document reading apparatus 200 is input to the optical scanning device 21C. The image signal for black output from the document reading apparatus 200 is input to the optical scanning device 21K. Although the following description is given of a configuration in which a yellow image is formed, similar configurations are provided to form magenta, cyan, and black images.

An outer peripheral surface of a photosensitive drum 22Y serving as a photosensitive member is charged by a charging device 23Y. After the outer peripheral surface of the photosensitive drum 22Y is charged, laser light corresponding to the image signal input from the document reading apparatus 200 to the optical scanning device 21Y is emitted from the optical scanning device 21Y to the outer peripheral surface of the photosensitive drum 22Y via an optical system such as a polygon mirror and mirrors. As a result, an electrostatic latent image is formed on the outer peripheral surface of the photosensitive drum 22Y.

Next, the electrostatic latent image is developed with toner in a developing device 24Y serving as a developing unit, thereby forming a toner image on the outer peripheral surface of the photosensitive drum 22Y. The toner image formed on the photosensitive drum 22Y is transferred onto a transfer belt 27 serving as an intermediate transfer member by a transfer roller 25Y provided at a position opposing the photosensitive drum 22Y. Toner remaining on the outer peripheral surface of the photosensitive drum 22Y after the toner image is transferred onto the transfer belt 27 is collected by a cleaning unit 26Y.

The yellow, magenta, cyan, and black toner images that have been transferred onto the transfer belt 27 serving as a transfer unit are transferred onto the recording medium by a transfer roller pair 28. A high voltage is applied to the transfer roller pair 28, and the toner images are transferred onto the recording medium due to the high voltage. In synchronization with this transfer timing, the registration rollers 20 send the recording medium into the transfer roller pair 28. When the recording medium, the skew of which has been corrected, is sent into the transfer roller pair 28 by the registration rollers 20, the preregistration roller 37 may be separated from the roller forming a nip portion with the preregistration roller 37. Separating the preregistration roller 37 from the roller forming the nip portion with the preregistration roller 37 makes it possible to prevent creases from being formed on the recording medium conveyed by the registration rollers 20.

The recording medium onto which the toner images have been transferred as described above is sent into a fixing device 29 serving as a fixing unit and is heated and pressed by the fixing device 29, thereby fixing the toner images onto the recording medium. In this manner, an image is formed on the recording medium by the image forming apparatus 100.

When the image printing apparatus 301 does not perform image formation, the transfer belt 27 is separated from photosensitive drums 22Y, 22M, 22C, and 22K. FIG. 2A illustrates a configuration for bringing the transfer belt 27 into contact with the photosensitive drums 22Y, 22M, 22C, and 22K, and FIG. 2B illustrates a configuration for separating the transfer belt 27 from the photosensitive drums 22Y, 22M, 22C, and 22K. FIG. 2A illustrates a state where the transfer belt 27 and the photosensitive drums 22Y, 22M, 22C, and 22K are in contact with each other. As illustrated in FIG. 2A, a rotation shaft 32a of a tension roller 32 that keeps the transfer belt 27 suspended is held by a holding unit 35. The holding unit 35 can rotate about a rotation axis 35a, and is supported by a stopper 37 so as to prevent the holding unit 35 from rotating counterclockwise in FIG. 2A. A rotation shaft 25Ya of the transfer roller 25Y is held by a holding unit 36Y. The holding unit 36Y can rotate about a rotation axis 36Ya, and is supported by a stopper 38Y so as to prevent the holding unit 36Y from rotating counterclockwise in FIG. 2A. A rotation shaft 25Ma of a transfer roller 25M is held by a holding unit 36M. The holding unit 36M can rotate about a rotation axis 36Ma, and is supported by a stopper 38M so as to prevent the holding unit 36M from rotating counterclockwise in FIG. 2A. A rotation shaft 25Ca of a transfer roller 25C is held by a holding unit 36C. The holding unit 36C can rotate about a rotation axis 36Ca, and is supported by a stopper 38C so as to prevent the holding unit 36C from rotating counterclockwise in FIG. 2A. A rotation shaft 25Ka of a transfer roller 25K is held by a holding unit 36K. The holding unit 36K can rotate about a rotation axis 36Ka, and is supported by a stopper 38K so as to prevent the holding unit 36K from rotating counterclockwise in FIG. 2A.

The stoppers 37, 38Y, 38M, 38C, and 38K are provided on an arm portion 40. When a cam 34 rotates clockwise in FIG. 2A, the arm portion 40 moves rightward. The cam 34 is driven by, for example, a motor (not illustrated), and rotates about a rotation axis 34a. When the cam 34 is rotated by a predetermined amount and the arm portion 40 moves rightward in FIG. 2A, each holding unit pivots and the rotation axis of each roller moves downward as illustrated in FIG. 2B. As a result, the photosensitive drums 22Y, 22M, 22C, and 22K and the transfer belt 27 are separated from each other.

In the state illustrated in FIG. 2B, when the cam 34 is rotated counterclockwise by the predetermined amount, the arm portion 40 moves leftward and returns to the state illustrated in FIG. 2A. In other words, the cam 34 and the arm portion 40 each serving as a movement member move between a first position illustrated in FIG. 2A and a second position illustrated in FIG. 2B.

Thus, in the present exemplary embodiment, when the image printing apparatus 301 does not perform image formation, the transfer belt 27 is separated from the photosensitive drums 22Y, 22M, 22C, and 22K.

As a result, it is possible to prevent deterioration on the surface of each of the photosensitive drums 22Y, 22M, 22C, and 22K.

When image formation is performed in a one-sided printing mode, the recording medium that has passed through the fixing device 29 is discharged onto a discharge tray 31 by discharge rollers 30. When image formation is performed in a double-sided printing mode, the fixing device 29 performs fixation processing on the first surface of the recording medium, and then the recording medium is conveyed to a reverse path 39 by reverse rollers 38. The first surface and the second surface of the recording medium conveyed to the reverse path 39 are reversed by the reverse rollers 38, and the recording medium is conveyed to a conveyance guide in which conveyance rollers 33, 34, 35, and 36 are provided. The recording medium is conveyed to the registration rollers 20 again by the conveyance rollers 33, 34, 35, and 36 and the like, and an image is formed on the second surface of the recording medium by the above-described method. After that, the recording medium is discharged onto the discharge tray 31 by the discharge rollers 30.

The configuration and functions of the image forming apparatus 100 have been described above.

<Control Configuration of Image Forming Apparatus>

Figure 3:
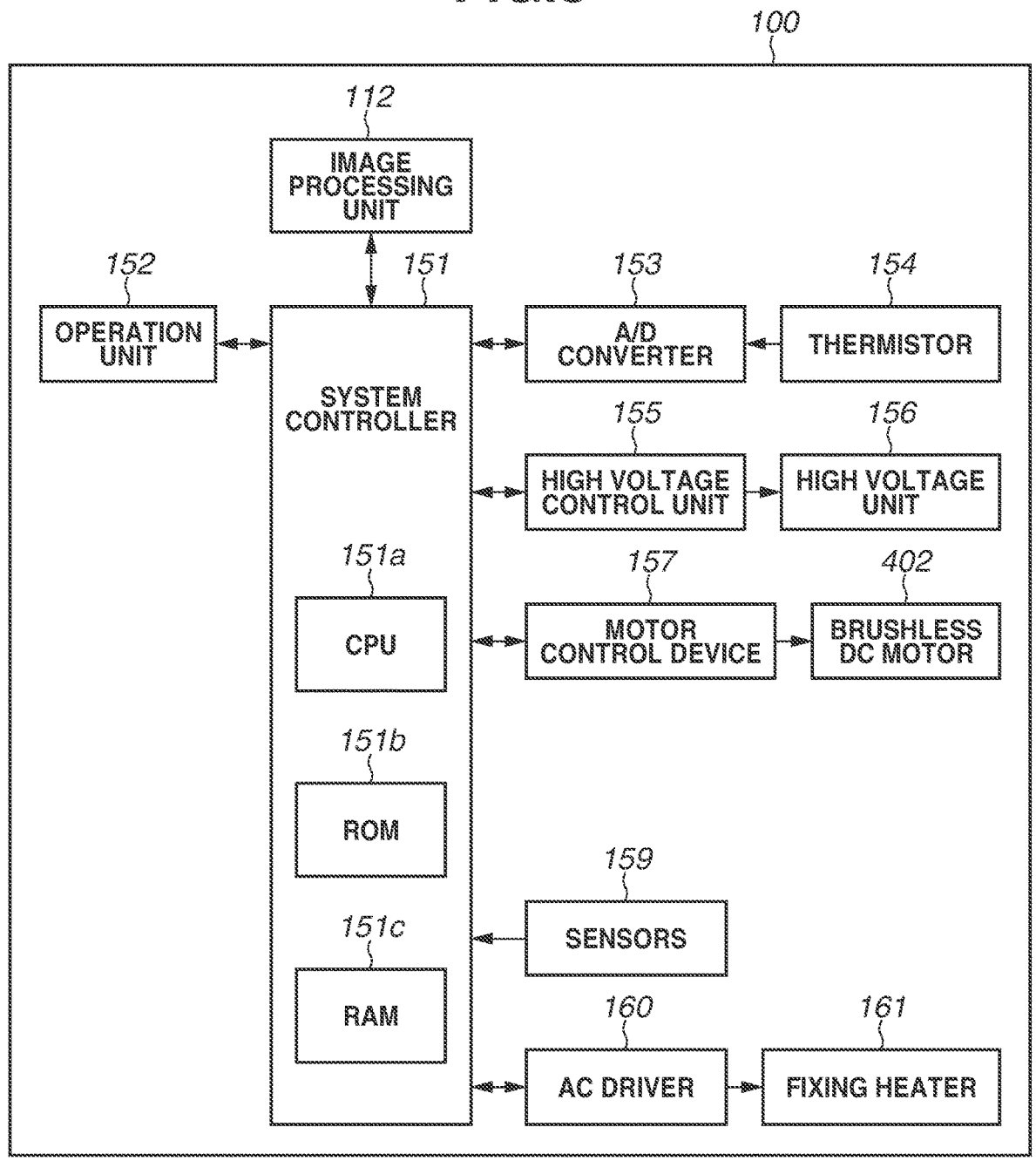
FIG. 3 is a block diagram illustrating a control configuration example of the image forming apparatus according to the first exemplary embodiment.

FIG. 3 is a block diagram illustrating a control configuration example of the image forming apparatus 100. As illustrated in FIG. 3, a system controller 151 includes a central processing unit (CPU) 151a, a read-only memory (ROM) 151b, and a random access memory (RAM) 151c. The system controller 151 is connected to each of an image processing unit 112, an operation unit 152, an analog-to-digital (A/D) converter 153, a high voltage control unit 155, a motor control device 157, sensors 159, and an alternate current (AC) driver 160. The system controller 151 can exchange data and commands with connected units.

The CPU 151a reads out and executes various programs stored in the ROM 151b, thereby executing various sequences related to a predetermined image formation sequence.

The RAM 151c is a storage device. The RAM 151c stores various kind of data such as setting values for the high voltage control unit 155, command values for the motor control device 157, and information received from the operation unit 152.

The system controller 151 transmits setting value data on various devices provided in the image forming apparatus 100 to the image processing unit 112. The setting value data is used for image processing in the image processing unit 112. Further, the system controller 151 receives signals from the sensors 159, and sets setting values for the high voltage control unit 155 based on the received signals.

The high voltage control unit 155 supplies a required voltage to a high voltage unit 156 (charging devices 23Y, 23M, 23C, and 23K, developing devices 24Y, 24M, 24C, 24K, transfer roller pair 28, etc.) depending on the setting value set by the system controller 151.

The motor control device 157 controls a brushless direct current (DC) motor according to a command output from the CPU 151a. While FIG. 3 illustrates only one motor control device, two or more motor control devices may be provided in the image forming apparatus 100. FIG. 3 illustrates only one motor. However, in practice, two or more motors are provided in the image forming apparatus 100. A single motor control device may control a plurality of motors.

The A/D converter 153 receives a detection signal detected by a thermistor 154 to detect the a temperature of a fixing heater 161, converts the detection signal from an analog signal to a digital signal, and transmits the digital signal to the system controller 151. The system controller 151 controls the AC driver 160 based on the digital signal received from the A/D converter 153. The AC driver 160 controls the fixing heater 161 so that the temperature of the fixing heater 161 is set to a temperature for performing fixation processing. The fixing heater 161 is a heater used for fixation processing and is included in the fixing device 29.

The system controller 151 controls the operation unit 152 to display, on a display unit provided in the operation unit 152, an operation screen for a user to set image formation conditions such as the type of a recording medium to be used (hereinafter referred to as the "paper type"). The system controller 151 receives information set by the user from the operation unit 152, and controls an operation sequence of the image forming apparatus 100 based on the information set by the user. The system controller 151 transmits information indicating the state of the image forming apparatus 100 to the operation unit 152. Examples of the information indicating the state of the image forming apparatus 100 include information about the number of images to be formed, the progress state of an image formation operation, and a jam or double feeding of sheets in the document reading apparatus 200 and the image printing apparatus 301. The operation unit 152 displays the information received from the system controller 151 on the display unit. In the present exemplary embodiment, during a period in which the operation unit 152 is operated, setting data and the like in the operation unit 152 are transmitted at predetermined time intervals from the operation unit 52 to the CPU 151a.

As described above, the system controller 151 controls the operation sequence of the image forming apparatus 100.

[Motor Control Device]

Next, the motor control device 157 will be described. A brushless DC motor 402 (hereinafter referred to as a motor 402) to be described below is not provided with a sensor such as a Hall element for detecting a rotational phase of a rotor of each motor.

Figure 4:
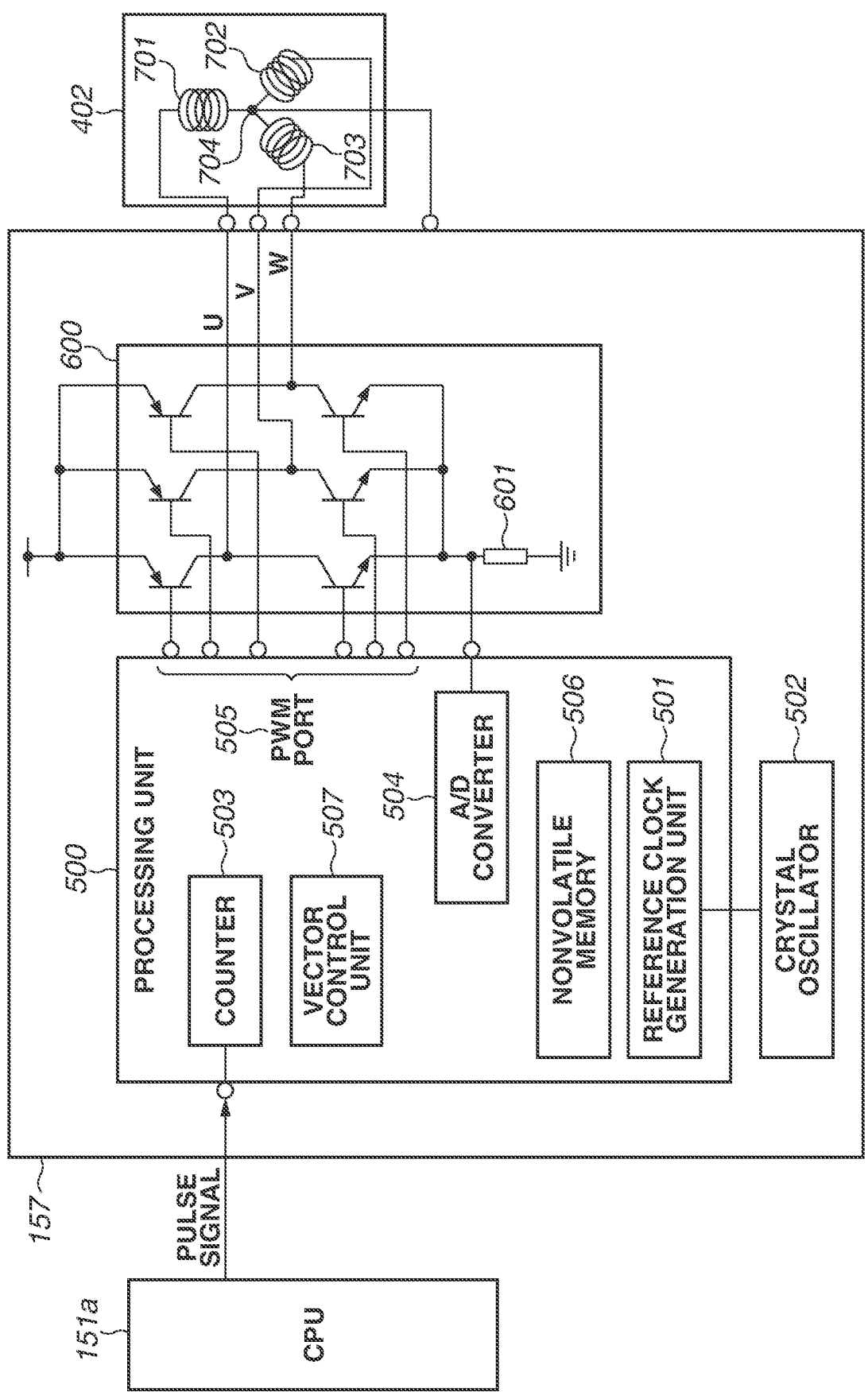
FIG. 4 is a block diagram illustrating a configuration example of a motor control device.

FIG. 4 is a block diagram illustrating a configuration example of the motor control device 157. The motor control device 157 is composed of at least one application-specific integrated circuit (ASIC), and executes functions to be described below.

The motor control device 157 includes a processing unit 500. The processing unit 500 includes a reference clock generation unit 501, a counter 503, an A/D converter 504, a nonvolatile memory 506, and a vector control unit 507.

The reference clock generation unit 501 generates a reference clock based on a signal from a crystal oscillator 502. The counter 503 counts pulse signals output from the CPU 151a, and determines the period of pulse signals based on the count value and the reference clock.

A pulse-width modulation (PWM) port 505 outputs a PWM signal for driving each switching element of a 3-phase inverter 600. Each switching element of the 3-phase inverter 600 is, for example, a field-effect transistor (FET). When the FET is driven by the PWM signal, a current is supplied to a plurality of coils 701 (U-phase), 702 (V-phase), and 703 (W-phase) of the motor 402.

The current supplied to each of the coils 701, 702, and 703 is detected by a resistor 601 and the A/D converter 504. Specifically, the A/D converter 504 converts a voltage across both ends of the resistor 601 from an analog value to a digital value, thereby detecting the current supplied to each of the coils 701, 702, and 703.

In the present exemplary embodiment, the current flowing through the coils of the respective phases is detected by the resistor 601 provided at a point where U-phase, V-phase, and W-phase wires are connected. However, the current detection method is not limited to this example. For example, the current flowing through the W-phase coil may be calculated based on the current detected by resistors provided on the U-phase wire and the V-phase wire, respectively, or the current flowing through the coils of the respective phases may be detected by resistors provided on U-phase, V-phase, and W-phase wires, respectively. That is, the current flowing through the wires of the respective phases may be detected by any known method.

<Structure of Motor>

Figure 5:
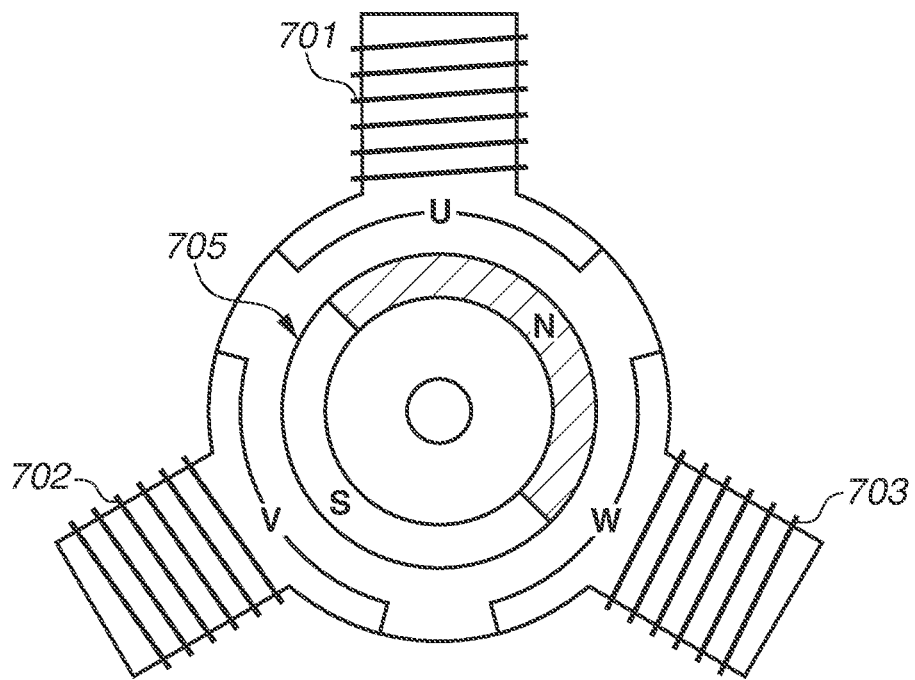
FIG. 5 illustrates a structure of a motor.

FIG. 5 illustrates a structure of the motor 402. In the present exemplary embodiment, the motor 402 is provided with the coils 701, 702, and 703 of three phases (U, V, W) wound around a stator.

A rotor 705 is composed of a permanent magnet and has an N-pole and an S-pole. A stopping position (rotational phase in a stopping state) of the rotor 705 is determined depending on a combination of the excited coils 701, 702, and 703, that is, an excitation phase. Assume that in the following description, X-Y phase excitation indicates excitation such that the X-phase corresponds to the N-pole and the Y-phase corresponds to the S-pole.

<Detection of Stopping Position>

Next, detection of the phase (stopping position) of the rotor 705 in a state where the rotor 705 stops will be described. In the present exemplary embodiment, the stopping position of the rotor 705 is detected using a variation of the inductance of each of the coils 701, 702, and 703 depending on the stopping position of the rotor 705.

A coil is generally made of a copper wire wound around a core formed by stacking a magnetic steel sheet. If an external magnetic field exists, the magnetic permeability of the magnetic steel sheet is small. In other words, if the external magnetic field exists, the inductance of each coil that is proportional to the magnetic permeability of the core is also small.

For example, as illustrated in FIG. 5, when the rotor 705 stops such that the center of an S-pole area of the rotor 705 is located at a position opposing the V-phase coil 702, the effect of the external magnetic field due to the rotor 705 is large, and thus the decreasing rate of the inductance of the coil 702 is large.

The decreasing rate of the inductance also varies depending on the orientation of a current flowing through the V-phase coil 702.

Specifically, when the orientation of the magnetic field due to the current flowing through the coil 702 is the same as the orientation of the external magnetic field from the rotor 705, the decreasing rate of the inductance is larger than that when the orientation of the magnetic field due to the current flowing through the coil 702 is opposite to the orientation of the external magnetic field from the rotor 705. Specifically, in the case illustrated in FIG. 5, the decreasing rate of the inductance when the V-phase (coil 702) is excited to the N-pole is larger than that when the V-phase (coil 702) is excited to the S-pole.

On the other hand, in the state illustrated in FIG. 5, the S-pole and the N-pole of the rotor 705 oppose at the W-phase (coil 703). Accordingly, the effect of the external magnetic field due to the rotor 705 is small and the decreasing rate of the inductance of the coil 703 is small.

Thus, the inductances of the coils 701, 702, and 703 have different values depending on the stopping position of the rotor 705.

Figure 6A:
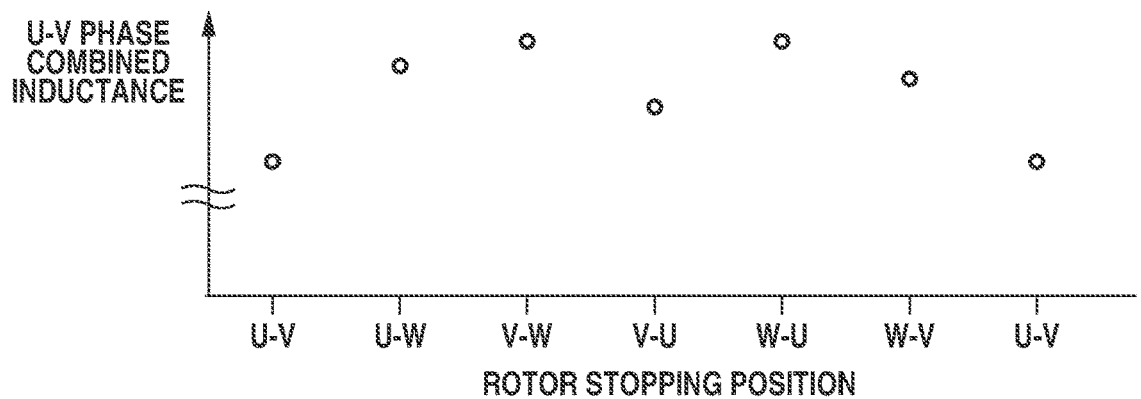
FIGS. 6A to 6C each illustrate a relationship between a stopping position of a rotor and an excitation phase.

FIG. 6A illustrates a relationship between the stopping position of the rotor 705 and a combined inductance at a U-V phase as one of excitation phases. In the following description, assume that the stopping position of the rotor 705 is represented by the excitation phase. The U-V phase combined inductance indicates a combined inductance of the coil 701 and the coil 702 that is measured by causing a current to flow such that the U-phase corresponds to the N-pole and the V-phase corresponds to the S-pole.

In the present exemplary embodiment, the inductance is detected by detecting a physical quantity that varies depending on the variation of the inductance. For example, a rising speed of a current (voltage) flowing through the coil varies depending on the value of the inductance. Accordingly, the current rising speed is measured.

Figure 6B:
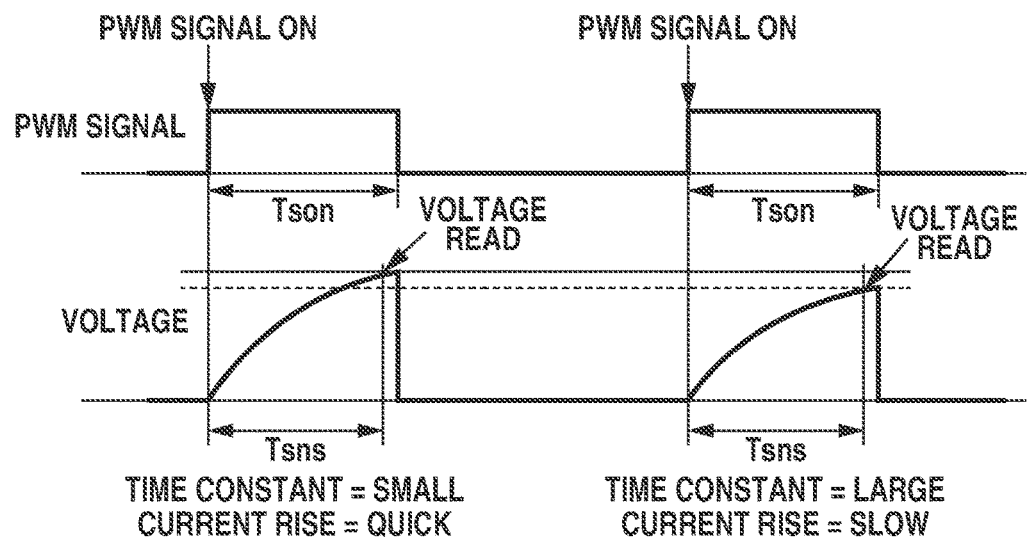

Specifically, as illustrated in FIG. 6B, the processing unit 500 turns on the PWM signal only during a predetermined period Tson. After a predetermined period (after a period Tsns) from the timing when the PWM signal is turned on, the processing unit 500 measures the speed of the current rise by detecting a voltage generated across the resistor 601 by the A/D converter 504. The predetermined period Tson is a period in which the rotor 705 does not move due to the generated torque. The relationship among the stopping position of the rotor 705, the excitation phase at which a current is caused to flow, and the voltage generated across the resistor 601 is preliminarily stored in the nonvolatile memory 506.

Figure 6C:
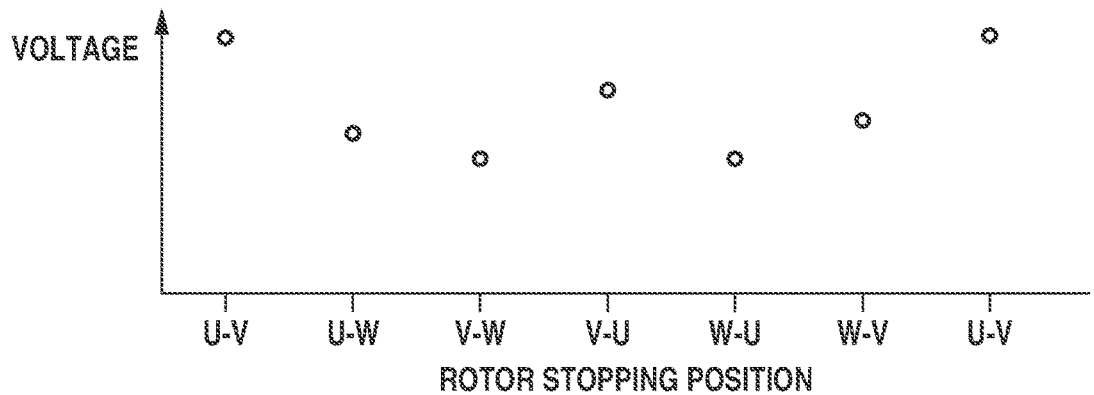

FIG. 6C illustrates the relationship between the stopping position of the rotor 705 and the voltage generated across the resistor 601 when the current is caused to flow to the U-V phase coils. As illustrated in FIG. 6C, the voltage generated across the resistor 601 when the current is caused to flow through the U-V phase coils is maximum when the stopping position of the rotor 705 corresponds to the U-V phase position. In this manner, since the voltage generated across the resistor 601 varies depending on the stopping position of the rotor 705, the processing unit 500 can determine the stopping position of the rotor 705 based on the voltage across the resistor 601. Specifically, for example, the processing unit 500 can measure the voltage across the resistor 601 (i.e., current flowing through the coil) after a predetermined period when the current is caused to flow to one or more excitation-phase coils, and can determine the stopping position of the rotor 705 based on the information stored in the nonvolatile memory 506.

The above-described stopping position detection method is merely an example in the present exemplary embodiment, and is not limited to this example. In other words, any known technique may be used to detect the stopping position based on the current flowing through the coil, without using a Hall element or a rotary encoder for detecting the stopping position of the rotor 705.

<Motor Control>
{Synchronization Control}

After the stopping position of the rotor 705 is detected, the motor control device 157 determines the excitation phase for fixing the rotor 705 at the stopping position, and controls the 3-phase inverter 600 so that the current is supplied to the determined excitation phase coils.

The CPU 151*a* outputs pulse signals to the motor control device 157 based on an operation sequence for the motor 402. The number of pulse signals corresponds to a target phase of the rotor 705, and the frequency of the pulse signal corresponds to a target speed of the rotor 705.

Every time a pulse signal is received from the CPU 151*a*, the motor control device 157 switches the excitation phases. For example, when a pulse signal is input after the U-V phase coils are excited, the motor control device 157 controls the 3-phase inverter 600 to excite the U-W phase coils. Further, when the pulse signal is input, the motor control device 157 controls the 3-phase inverter 600 to excite the V-W phase coils. In the present exemplary embodiment, the motor control device 157 detects the stopping position of the rotor 705, and then performs synchronization control for driving the motor 402 in response to the pulse signal output from the CPU 151*a* as described above. In the synchronization control, a driving current that flows to the coils 701, 702, and 703 is controlled such that a current having a predetermined magnitude flows to the coils 701, 702, and 703. Specifically, so that the motor 402 does not step out even if a variation in the load torque applied to the rotor 705 occurs, a driving current having a magnitude (amplitude) corresponding to a torque resulting from adding a predetermined margin to the torque assumed to be required for rotation of the rotor 705 is supplied to the coils 701, 702, and 703. This is because, in the synchronization control, a configuration in which the magnitude of the driving current is controlled based on the determined (estimated) rotational phase and rotational speed is not used (feedback control is not performed), and thus the driving current cannot be adjusted in accordance with the load torque applied to the rotor. The larger the magnitude of the current, the larger the torque applied to the rotor 705 becomes. The amplitude also corresponds to the magnitude of a current vector.

{Vector Control}

According to the present exemplary embodiment, in a state where the motor control device 157 executes the synchronization control, if the frequency of the pulse signal (i.e., the value corresponding to the target speed of the rotor 705) output from the CPU 151*a* is more than or equal to a predetermined value, the motor control device 157 causes the vector control unit 507 to perform vector control. When the frequency of the pulse signal output from the CPU 151*a* is smaller than the predetermined value in a state where the motor control device 157 executes the vector control, the motor control device 157 performs the synchronization control.

Figure 7:
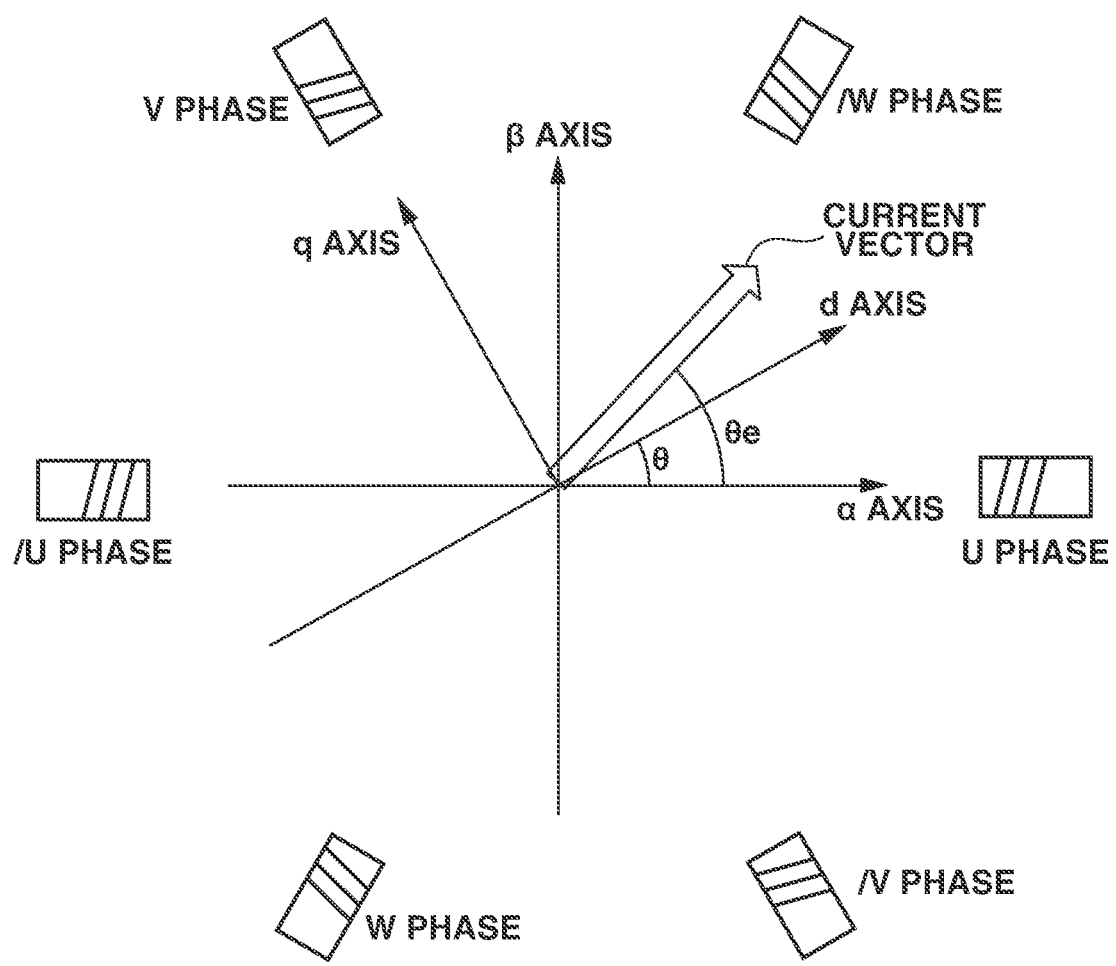
FIG. 7 illustrates a relationship with a rotating coordinate system represented by a U-phase, a V-phase, a W-phase, a d-axis, and a q-axis.

FIG. 7 illustrates a relationship with a rotating coordinate system represented by the U-phase, the V-phase, the W-phase, a d-axis, and a q-axis. As illustrated in FIG. 7, in a coordinate system at rest, an a-axis is defined as an axis corresponding to the U-phase coil, and a β-axis is defined as an axis orthogonal to the α-axis. In FIG. 7, the d-axis is defined along the direction of a magnetic flux formed by the magnetic poles of the permanent magnet used for the rotor 705, and the q-axis is defined along a direction rotated 90 degrees counterclockwise from the d-axis (direction orthogonal to d-axis). An angle formed between the a-axis and the d-axis is defined as θ, and the rotational phase of the rotor 705 is represented by the angle θ. In the vector control, a rotating coordinate system based on a rotational phase θ is used. Specifically, in the vector control, a q-axis component (torque current component) and a d-axis component (excitation current component), which are current components in the rotating coordinate system of the current vector corresponding to the driving current flowing through each coil, are used. The q-axis component (torque current component) generates a torque in the rotor, and the d-axis component (excitation current component) influences the strength of the magnetic flux passing through each coil. In FIG. 7, the direction in which the rotor 705 rotates counterclockwise is illustrated as a positive direction.

The vector control is a control method for controlling the motor 402 by performing speed feedback control for controlling the value of the torque current component and the value of the excitation current component so that a deviation between a command speed representing the target speed of the rotor 705 and an actual rotational speed of the rotor 705 becomes smaller. There is also a method for controlling the motor 402 by performing phase feedback control for controlling the value of the torque current component and the value of the excitation current component so that a deviation between a command phase representing the target phase of the rotor 705 and an actual rotational phase of the rotor 705 becomes smaller.

Figure 8:
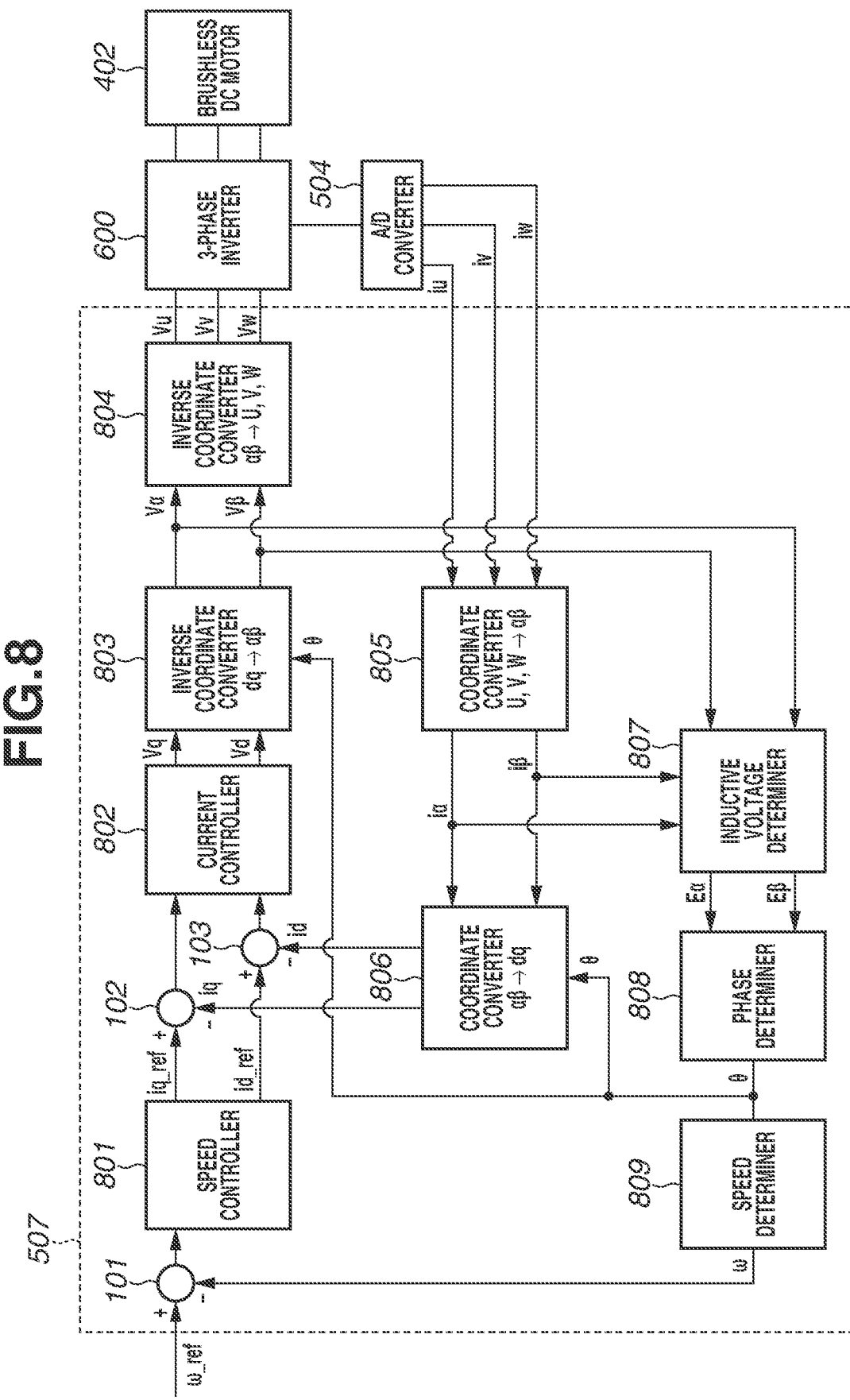
FIG. 8 is a block diagram illustrating a configuration example of a vector control unit.

FIG. 8 is a block diagram illustrating a configuration example of the vector control unit 507. The vector control unit 507 is composed of at least one ASIC and executes functions to be described below.

The vector control unit 507 includes, as circuits for performing the vector control, a speed controller 801, a current controller 802, inverse coordinate converters 803 and 804, and coordinate converters 805 and 806. The coordinate converter 805 converts a current vector corresponding to a driving current flowing through each coil of the U-phase, V-phase, and W-phase of the motor 402 into a coordinate system at rest represented by the α-axis and β-axis by Clarke transformation. The coordinate converter 806 performs a coordinate conversion on the current values converted by the coordinate converter 805 into the coordinate system at rest represented by the α-axis and β-axis into a rotating coordinate system represented by the q-axis and the d-axis. As a result, the driving current flowing through each coil is represented by the current value of the q-axis component (q-axis current) and the current value of the d-axis component (d-axis current), which are current values in the rotating coordinate system. The q-axis current corresponds to a torque current that generates a torque in the rotor 705 of the motor 402. The d-axis current corresponds to an excitation current that influences the strength of the magnetic flux passing through each coil of the motor 402. The vector control unit 507 can independently control the q-axis current and the d-axis current. As a result, the vector control unit 507 controls the q-axis current depending on the load torque applied to the rotor 705, thereby making it possible to efficiently generate a torque for causing the rotor 705 to rotate. That is, in the vector control, the magnitude of the current vector illustrated in FIG. 7 varies depending on the load torque applied to the rotor 705.

The vector control unit 507 determines the rotational phase θ and a rotational speed w of the rotor 705 of the motor 402 by a method to be described below, and performs the vector control based on the determination result.

As described above, the counter 503 calculates the frequency of the pulse signal output from the CPU 151a. The vector control unit 507 receives the value corresponding to the frequency of the pulse signal calculated by the counter 503, that is, a command speed ω_ref representing the target speed of the rotor 705.

A subtractor 101 calculates a deviation Δω between the rotational speed w of the rotor 705 of the motor 402 and the command speed ω_ref, and outputs the calculated deviation Δω.

The speed controller 801 acquires the deviation Δω at a period T (e.g., 200 μs). Based on proportional control (P), integral control (I), and derivative control (D), the speed controller 801 generates a q-axis current command value iq_ref and a d-axis current command value id_ref so that the deviation Δω output from the subtractor 101 becomes smaller, and then the speed controller 801 outputs the q-axis current command value iq_ref and the d-axis current command value id_ref. Specifically, based on P-control, I-control, and D-control, the speed controller 801 generates the q-axis current command value iq_ref and the d-axis current command value id_ref so that the deviation Δω output from the subtractor 101 becomes "0", and then the speed controller 801 outputs the q-axis current command value iq_ref and the d-axis current command value id_ref. P-control is a control method for controlling the value of a target to be controlled based on a value proportional to the deviation between a command value and an estimated value. I-control is a control method for controlling the value of a target to be controlled based on a value proportional to the time integral of the deviation between a command value and an estimated value. D-control is a control method for controlling the value of a target to be controlled based on a value proportional to a change over time in the deviation between a command value and an estimated value. The speed controller 801 according to the present exemplary embodiment generates the q-axis current command value iq_ref and the d-axis current command value id_ref based on P-control, I-control, and D-control. However, the configuration of the speed controller 801 is not limited to this example. For example, the speed controller 801 may generate the q-axis current command value iq_ref and the d-axis current command value id_ref based on P-control and I-control. When a permanent magnet is used for the rotor 705, the d-axis current command value id_ref that influences the strength of the magnetic flux passing through each coil is generally set to "0". However, the d-axis current command value id_ref is not limited to this example.

The driving currents flowing through the respective coils of the U-phase, V-phase, and W-phase of the motor 402 are converted from analog values to digital values by the A/D converter 504. The period at which the A/D converter 504 samples a current is, for example, a period (e.g., 25 μs) that is less than or equal to the period T at which the speed controller 801 acquires the deviation Δω.

Current values iu, iv, and iw of the driving currents converted from analog values to digital values by the A/D converter 504 are input to the coordinate converter 805.

The coordinate converter 805 converts the received current values iu, iv, and iw into current values iα and iβ in the coordinate system at rest by the following expressions.

$$i\alpha = iu - \frac{1}{2}iv - \frac{1}{2}iw \quad (1)$$

$$i\beta = \frac{\sqrt{3}}{2}iv - \frac{\sqrt{3}}{2}iv \quad (2)$$

$$iu + iv + iw = 0 \quad (3)$$

The current values iα and iβ in the coordinate system at rest are represented by the following expressions using a magnitude I of a current vector corresponding to driving currents flowing through the respective coils of the U-phase, the V-phase, and the W-phase and a phase θe of the current vector. The phase θe of the current vector is defined as an angle formed between the α-axis and the current vector.

$$i\alpha = I * \cos(\theta e) \quad (4)$$

$$i\beta = I * \sin(\theta e) \quad (5)$$

These current values iα and iβ are input to the coordinate converter 806 and an inductive voltage determiner 807.

The coordinate converter 806 converts the current values iα and iβ in the coordinate system at rest into a current value iq of the q-axis current and a current value id of the d-axis current in the rotating coordinate system by the following expressions.

$$id = i\alpha * \cos\theta + i\beta * \cos\theta \quad (6)$$

$$iq = -i\alpha * \sin\theta + i\beta * \cos\theta \quad (7)$$

A subtractor 102 receives the q-axis current command value iq_ref output from the speed controller 801 and the current value iq output from the coordinate converter 806. The subtractor 102 calculates a deviation between the q-axis current command value iq_ref and the current value iq, and outputs the deviation to the current controller 802.

A subtractor 103 receives the d-axis current command value id_ref output from the speed controller 801 and the current value id output from the coordinate converter 806. The subtractor 103 calculates a deviation between the d-axis current command value id_ref and the current value id, and outputs the deviation to the current controller 802.

The current controller 802 generates a drive voltage Vq based on P-control, I-control, and D-control so that the deviation output from the subtractor 102 becomes smaller. Specifically, the current controller 802 generates the drive voltage Vq so that the deviation output from the subtractor 102 becomes "0", and outputs the drive voltage Vg to the inverse coordinate converter 803.

The current controller 802 generates a drive voltage Vd based on P-control, I-control, and D-control so that the deviation output from the subtractor 103 becomes smaller. Specifically, the current controller 802 generates the drive voltage Vd so that the deviation output from the subtractor 103 becomes "0", and outputs the drive voltage Vd to the inverse coordinate converter 803.

The current controller 802 according to the present exemplary embodiment generates the drive voltages Vq and Vd based on P-control, I-control, and D-control. However, the configuration of the current controller 802 is not limited to this example. For example, the current controller 802 may generate the drive voltages Vq and Vd based on P-control and I-control.

The inverse coordinate converter 803 inversely converts the drive voltages Vq and Vd in the rotating coordinate system output from the current controller 802 into drive voltages Vα and Vβ in the coordinate system at rest by the following expressions.

$$V\alpha = Vd^* \cos\theta - Vq^* \sin\theta \quad (8)$$

$$V\beta = Vd^* \sin\theta + Vq^* \cos\theta \quad (9)$$

The inverse coordinate converter 803 outputs the inversely converted drive voltages Vα and Vβ to the inductive voltage determiner 807 and the inverse coordinate converter 804.

The inverse coordinate converter 804 converts the received drive voltages Vα and Vβ into a U-phase drive voltage Vu, a V-phase drive voltage Vv, and a W-phase drive voltage Vw by the following expressions.

$$Vu = \frac{2}{3}i\alpha \quad (10)$$

$$Vv = -\frac{1}{3}i\alpha + \frac{1}{\sqrt{3}}i\beta \quad (11)$$

$$Vw = -\frac{1}{3}i\alpha - \frac{1}{\sqrt{3}}i\beta \quad (12)$$

The inverse coordinate converter 804 outputs the converted drive voltages Vu, Vv, and Vw to the 3-phase inverter 600.

The 3-phase inverter 600 is driven by the PWM signal based on the drive voltages Vu, Vv, and Vw received from the inverse coordinate converter 804. As a result, the 3-phase inverter 600 generates driving currents iu, iv, and iw corresponding to the drive voltages Vu, Vv, and Vw, respectively, and supplies the driving currents iu, iv, and iw to the coils of the respective phases of the motor 402, thereby driving the motor 402.

Next, a configuration for determining the rotational phase θ will be described. To determine the rotational phase θ of the rotor 705, values Eα and Eβ corresponding to inductive voltages induced in the coils of the U-phase, V-phase, and W-phase of the motor 402 by the rotation of the rotor 705 are used. The values Eα and Eβ are inductive voltage values corresponding to the α-axis and the β-axis, respectively. The inductive voltage values are determined (calculated) by the inductive voltage determiner 807. Specifically, the inductive voltages Eα and Eβ are determined by the following expressions based on the current values iα and iβ output from the coordinate converter 805 and the drive voltages Vα and Vβ output from the inverse coordinate converter 803.

$$E\alpha = V\alpha - R*i\alpha - L*\frac{di\alpha}{dt} \quad (13)$$

$$E\alpha = V\beta - R*i\beta - L*\frac{di\beta}{dt} \quad (14)$$

In Expressions (13) and (14), R represents a coil resistance, and L represents a coil inductance. The values of the coil resistance R and the coil inductance L are values unique to the motor 402 that is currently used, and are preliminarily stored in the ROM 151b, a memory (not illustrated) provided in the motor control device 157, or the like.

The inductive voltages Eα and Eβ determined by the inductive voltage determiner 807 are output to a phase determiner 808.

The phase determiner 808 determines the rotational phase θ of the rotor 705 of the motor 402 by the following expression based on the ratio between the inductive voltage Eα and the inductive voltage Eβ output from the inductive voltage determiner 807.

$$\theta = \tan^{-1}\left(\frac{E\beta}{E\alpha}\right) \quad (15)$$

In the present exemplary embodiment, the phase determiner 808 determines the rotational phase θ by performing the calculation based on Expression (15). However, the configuration of the phase determiner 808 is not limited to this example. For example, the phase determiner 808 may determine the rotational phase θ by referring to a table indicating a relationship between the inductive voltage Eα and the inductive voltage Eβ and the rotational phase θ corresponding to the inductive voltage Eα and the inductive voltage Eβ.

The rotational phase θ obtained as described above is input to a speed determiner 809, the inverse coordinate converter 803, and the coordinate converter 806.

The speed determiner 809 determines the rotational speed w based on a change over time in the rotational phase θ output from the phase determiner 808. The rotational speed w is determined by the following expression (16).

$$\omega = \frac{d\theta}{dt} \quad (16)$$

The rotational phase w obtained as described above is input to the subtractor 101.

The vector control unit 507 repeatedly performs the above-described control operation in the case of performing the vector control.

As described above, the vector control unit 507 according to the present exemplary embodiment performs the vector control using speed feedback control for controlling the current values in the rotating coordinate system so that the deviation between the command speed ω_ref and the rotational speed w becomes smaller. Performing the vector control makes it possible to prevent the motor 402 from entering a step-out state and prevent an increase in motor sound and an increase in power consumption due to an excess torque.

In the present exemplary embodiment, the rotational phase θ and the rotational speed ω are determined based on Expressions (13) to (16). However, the method of determining the rotational phase θ and the rotational speed ω is not limited to this example. That is, the rotational phase θ and the rotational speed ω may be determined by any known method.

[Motor Driving Sequence]

Next, a sequence for driving the motor 402 according to the present exemplary embodiment will be described. In the present exemplary embodiment, the vibration of the motor 402 when the motor 402 provided in the image forming apparatus 100 is started can be suppressed by applying the following configuration. In the following description, the motor 402 drives the photosensitive drum 22K.

Figure 9:
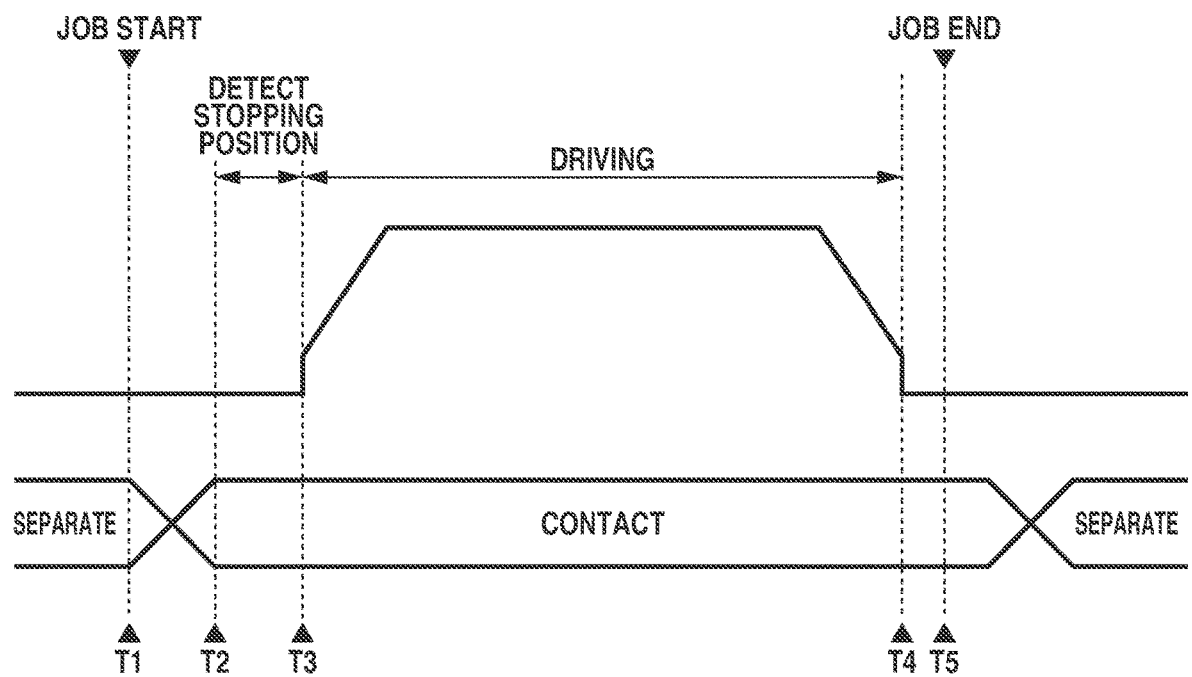
FIG. 9 illustrates a motor driving sequence.

FIG. 9 illustrates a sequence for driving the motor 402. The sequence for driving the motor 402 will be described below with reference to FIG. 9.

As illustrated in FIG. 9, when an instruction to start a print job is issued from, for example, an external apparatus such as a personal computer (PC) or the operation unit 152 to the CPU 151a (time T1), the CPU 151a controls the motor to drive the cam 34 so that the transfer belt 27 contacts the photosensitive drums 22Y, 22M, 22C, and 22K. As a result, a relative position between the transfer belt 27 and the photosensitive drums 22Y, 22M, 22C, and 22K is changed.

When the transfer belt 27 contacts the photosensitive drums 22Y, 22M, 22C, and 22K (time T2), the motor control device 157 starts an operation for detecting the stopping position of the rotor 705 of the motor 402.

When the operation for detecting the stopping position of the rotor 705 of the motor 402 is completed (time T3), the motor control device 157 drives the motor 402 by synchronization control, and then executes the vector control.

Then, the motor 402 is driven at a predetermined rotational speed.

After that, driving of the motor 402 based on the image formation sequence is completed (time T4), and the print job ends (time T5).

If a new print job is not input after a lapse of a predetermined period after the print job ends, the CPU 151a controls the motor to drive the cam 34 so that the transfer belt 27 is separated from the photosensitive drums 22Y, 22M, 22C, and 22K. As a result, the relative position between the transfer belt 27 and the photosensitive drums 22Y, 22M, 22C, and 22K is changed. If a new print job is input after the print job ends before the lapse of the predetermined period, the CPU 151a starts the new print job without separating the transfer belt 27 from the photosensitive drums 22Y, 22M, 22C, and 22K.

Figure 10:
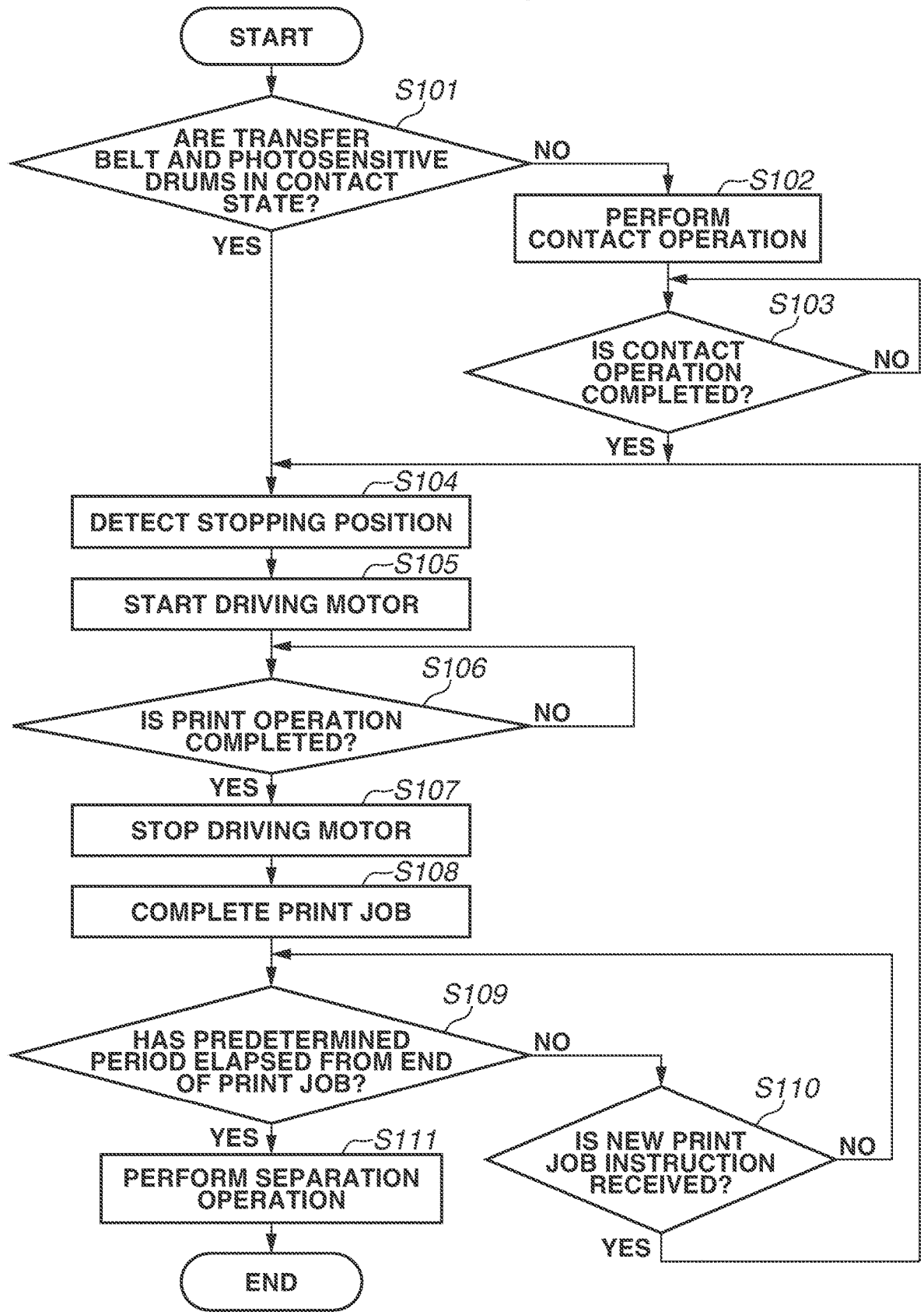
FIG. 10 is a flowchart illustrating motor control processing performed by a central processing unit (CPU) according to the first exemplary embodiment.

FIG. 10 is a flowchart illustrating processing for controlling the motor 402 by the CPU 151a. When, an instruction to start a print job is issued from, for example, the operation unit 152 or an external apparatus such as a PC, the CPU 151a serving as a reception unit starts the processing in the flowchart.

In step S101, it is determined whether the transfer belt 27 and the photosensitive drums 22Y, 22M, 22C, and 22K are in a contact state. If the transfer belt 27 and the photosensitive drums 22Y, 22M, 22C, and 22K are not in the contact state (NO in step S101), the processing proceeds to step S102. In step S102, the CPU 151a controls the motor for driving the cam 34 so that the transfer belt 27 contacts the photosensitive drums 22Y, 22M, 22C, and 22K (contact operation). As a result, the relative position between the transfer belt 27 and the photosensitive drums 22Y, 22M, 22C, and 22K is changed.

In step S103, it is determined whether the contact operation is completed. If the transfer belt 27 contacts the photosensitive drums 22Y, 22M, 22C, and 22K (YES in step S103), the processing proceeds to step S104. The CPU 151a may determine whether the transfer belt 27 contacts the photosensitive drums 22Y, 22M, 22C, and 22K, for example, based on a sensor for detecting the position of the arm portion 40. Alternatively, the CPU 151a may determine whether the transfer belt 27 contacts the photosensitive drums 22Y, 22M, 22C, and 22K, for example, based on a sensor for detecting the rotational phase of the motor for driving the cam 34. The sensor for detecting the position of the arm portion 40 and the sensor for detecting the rotational phase of the motor are included in the sensors 159.

In step S101, if the transfer belt 27 and the photosensitive drums 22Y, 22M, 22C, and 22K are in the contact state (YES in step S101), the processing proceeds to step S104.

Next, in step S104, the CPU 151a controls the motor control device 157 to detect the stopping position of the motor 402 in the stopping state. As a result, the stopping position of the rotor 705 of the motor 402 is detected by the motor control device 157.

After that, in step S105, the CPU 151a controls the motor control device 157 to start driving the motor 402. As a result, driving of the motor 402 is started by the motor control device 157.

In step S106, it is determined whether the print operation is completed. If the print operation is completed (YES in step S106), the processing proceeds to step S107. In step S107, the CPU 151a controls the motor control device 157 to stop driving the motor 402. As a result, the rotation of the motor 402 is stopped.

After the print job ends in step S108, in step S109, it is determined whether a predetermined period has elapsed from the end of the print job. If the predetermined period has not elapsed from the end of the print job in step S109 (NO in step S109), the processing proceeds to step S110.

In step S110, it is determined whether an instruction to start a new print job is received. If the instruction to start a new print job is not received (NO in step S110), the processing returns to step S109.

On the other hand, in step S110, if the instruction to start a new job is received (YES in step S110), the processing returns to step S104.

In step S109, if the predetermined period has elapsed from the end of the print job (YES in step S109), the processing proceeds to step S111. In step S111, the CPU 151a controls the motor to drive the cam 34 so that the transfer belt 27 is separated from the photosensitive drums 22Y, 22M, 22C, and 22K (separation operation). As a result, the transfer belt 27 and the photosensitive drums 22Y, 22M, 22C, and 22K are separated from each other.

As described above, in the present exemplary embodiment, in the state where the transfer belt 27 and the photosensitive drum 22K are in contact with each other, the stopping position of the motor 402 for driving the photosensitive drum 22K is detected. In the state where the transfer belt 27 and the photosensitive drum 22K are in contact with each other, a frictional force is generated between the surface of the transfer belt 27 and the surface of the photosensitive drum 22K. When the operation for detecting the stopping position of the motor 402 is performed in the state where the transfer belt 27 and the photosensitive drum 22K are in contact with each other, the frictional force prevents the rotor 705 of the motor 402 from rotating due to the voltage applied to each coil of the motor 402 in the detection operation. In other words, the vibration of the motor 402 due to the application of the voltage to each coil of the motor 402 in the detection operation and noise due to the vibration can be suppressed. That is, the vibration of the motor 402 when the motor 402 provided in the image forming apparatus 100 is started can be suppressed.

In the present exemplary embodiment, the stopping position of the motor 402 is detected in the state where the transfer belt 27 and the photosensitive drums 22Y, 22M, 22C, and 22K are in contact with each other. However, the detection operation is not limited to this example. That is, the stopping position of the motor 402 may be detected in the state where at least the photosensitive drum 22K to be driven by the motor 402 is in contact with the transfer belt 27.

While the present exemplary embodiment illustrates an example where the motor 402 drives the photosensitive drum 22K, the configuration of the motor 402 is not limited to this example.

For example, the motor 402 may be configured to drive the photosensitive drums 22Y, 22M, and 22C, and may be configured to rotationally drive the transfer belt 27. In this case, the stopping position of the motor 402 may be detected in the state where the transfer belt 27 and the photosensitive drums 22Y, 22M, 22C, and 22K are in contact with each other, thereby making it possible to suppress the vibration of the motor 402 when the motor 402 in the image forming apparatus 100 is started.

The configuration in which the transfer belt 27 and the transfer roller of the transfer roller pair 28 that is located outside the transfer belt 27 are brought into contact with each other or are separated from each other may be applied to the image printing apparatus 301. In such a configuration, when image formation is performed by the image printing apparatus 301, the transfer belt 27 and the transfer roller located outside the transfer belt 27 contact each other, and when image formation is not performed by the image printing apparatus 301, the transfer belt 27 and the transfer roller located outside the transfer belt 27 are separated from each other. Consequently, it is possible to prevent deterioration of the transfer roller pair 28. In such a configuration, the motor 402 may be configured to rotationally drive the transfer belt 27.

In this case, a frictional force is generated between the surface of the transfer belt 27 and the surface of the transfer roller located outside the transfer belt 27 in a state where the transfer belt 27 and the transfer roller located outside the transfer belt 27 are in contact with each other. When the operation for detecting the stopping position of the motor 402 is performed in the state where the transfer belt 27 and the transfer roller located outside the transfer belt 27 are in contact with each other, the frictional force prevents the rotor 705 of the motor 402 from rotating due to the voltage applied to each coil of the motor 402 in the detection operation. In other words, the vibration of the motor 402 due to the application of the voltage to each coil of the motor 402 in the detection operation and noise due to the vibration can be suppressed. That is, the vibration of the motor 402 when the motor 402 provided in the image forming apparatus 100 is started can be suppressed.

A configuration in which a first rotary member in the fixing device 29 and a second rotary member forming the nip portion with the first rotary member are brought into contact with each other or are separated from each other may be applied to the image printing apparatus 301. In such a configuration, when image formation is performed by the image printing apparatus 301, the first rotary member and the second rotary member contact each other, and when image formation is not performed by the image printing apparatus 301, the first rotary member and the second rotary member are separated from each other.

Consequently, it is possible to prevent deterioration of each of the first rotary member and the second rotary member. In such a configuration, the motor 402 may be configured to rotationally drive the first rotary member. In this case, in a state where the first rotary member and the second rotary member are in contact with each other, a frictional force is generated between the surface of the first rotary member and the surface of the second rotary member. When the operation for detecting the stopping position of the motor 402 is performed in the state where the first rotary member and the second rotary member are in contact with each other, the frictional force prevents the rotor 705 of the motor 402 from rotating due to the voltage applied to each coil of the motor 402 in the detection operation. In other words, the vibration of the motor 402 due to the application of the voltage to each coil of the motor 402 in the detection operation and noise due to the vibration can be suppressed. That is, the vibration of the motor 402 when the motor 402 provided in the image forming apparatus 100 is started can be suppressed.

As described above, the operation for detecting the stopping position of the motor 402 is performed in a state where a load to be driven by the motor 402 and a contact member to be brought into contact with the load or separated from the load are in contact with each other, thereby making it possible to suppress the vibration of the motor 402 when the motor 402 provided in the image forming apparatus 100 is started.

In the vector control according to the present exemplary embodiment, the motor 402 is controlled by performing the speed feedback control. However, the control method is not limited to this example. For example, the motor 402 may be controlled by feeding back the rotational phase θ of the rotor 705 of the motor 402.

In the present exemplary embodiment, the brushless DC motor 402 is used as a motor for driving a load. However, any other motor such as a stepping motor or a direct current (DC) motor may be used. The number of phases of coils included in the motor 402 is not limited to three (U-phase, V-phase, W-phase), but instead two or less or four or more phases may be used.

Further, in the present exemplary embodiment, the CPU 151a may include the functions of the motor control device 157.

The photosensitive drums 22Y, 22M, 22C, and 22K, the charging devices 23Y, 23M, 23C, and 23K, the developing devices 24Y, 24M, 24C, and 24K, the transfer rollers 25Y, 25M, 25C, and 25K, the transfer belt 27, and the like are included in an image forming unit.

According to an aspect of the present disclosure, it is possible to prevent the vibration of the motor 402 when the motor 402 provided in the image forming apparatus 100 is started.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-028713, filed Feb. 25, 2021, which is hereby incorporated by reference herein in its entirety.

What is claimed is:

1. An image forming apparatus that forms an image on a recording medium, the image forming apparatus comprising:
 a motor configured to drive a first member;
 a second member;
 a movement member configured to move between a first position and a second position, the first member and the second member being in contact with each other in a state where the movement member is located at the first position, the first member and the second member being separated from each other in a state where the movement member is located at the second position; and
 a controller configured to:

receive an instruction to start a print job for forming the image on the recording medium, after receiving the instruction, move the movement member from the second position to the first position, in a case where the movement member is at the second position, not execute an initial operation, and in a case where the movement member moves from the second position to the first position, execute the initial operation in a state where the movement member is located at the first position, wherein, in the initial operation, the controller determines a phase of a rotor of the motor in a stopping state where the rotor stops based on a current flowing through a coil of the motor by supplying the current to the coil of the motor in the stopping state, and control the current supplied to the coil so that the rotor in the stopping state is rotated based on the phase determined in the initial operation.

2. The image forming apparatus according to claim 1, wherein the movement member is located at the second position in a state where the controller does not receive the instruction and the print job is executed.

3. The image forming apparatus according to claim 1, wherein based on the phase determined in the initial operation, the controller starts driving the motor in a first control mode for controlling the current supplied to the coil based on a current having a predetermined magnitude.

4. The image forming apparatus according to claim 3, further comprising:
   a detector configured to detect the current flowing through the coil; and
   a phase determiner configured to determine a rotational phase of the rotor being rotated based on the current detected by the detector,
   wherein the controller switches a control mode for driving the motor from the first control mode to a second control mode after driving of the motor is started in the first control mode, and
   wherein in the second control mode, the controller controls the current supplied to the coil based on a torque current component and an excitation current component, the torque current component being a current component that is represented in a rotating coordinate system based on the rotational phase determined by the phase determiner and generates a torque in the rotor, the excitation current component being a current component that is represented in the rotating coordinate system and influences a strength of a magnetic flux passing through the coil.

5. The image forming apparatus according to claim 4, wherein in a case where a value corresponding to a rotational speed of the rotor is greater than a predetermined value after driving of the motor is started in the first control mode, the controller switches the control mode from the first control mode to the second control mode.

6. The image forming apparatus according to claim 4, wherein in the second control mode, the controller controls the current supplied to the coil so that a deviation between a target value of the torque current component and a value of the torque current component of the current detected by the detector becomes smaller, and
   wherein the target value of the torque current component is set so that a deviation between the rotational phase determined by the phase determiner and a command phase representing a target phase of the rotational phase of the rotor becomes smaller.

7. The image forming apparatus according to claim 4, further comprising a speed determiner configured to determine a rotational speed of the rotor,
   wherein in the second control mode, the controller controls the current supplied to the coil so that a deviation between a target value of the torque current component and a value of the torque current component of the current detected by the detector becomes smaller, and
   wherein the target value of the torque current component is set so that a deviation between the rotational speed determined by the speed determiner and a command speed representing a target speed of the rotational speed of the rotor becomes smaller.

8. The image forming apparatus according to claim 1, further comprising:
   a detector configured to detect the current flowing through the coil; and
   a phase determiner configured to determine a rotational phase of the rotor being rotated based on the current detected by the detector,
   wherein the controller drives the motor in a first control mode based on the phase determined in the initial operation, and
   wherein in the first control mode, the controller controls the current supplied to the coil based on based on a torque current component and an excitation current component, the torque current component being a current component that is represented in a rotating coordinate system based on the rotational phase determined by the phase determiner and generates a torque in the rotor, the excitation current component being a current component that is represented in the rotating coordinate system and influences a strength of a magnetic flux passing through the coil.

9. The image forming apparatus according to claim 8, wherein in the first control mode, the controller controls the current supplied to the coil so that a deviation between a target value of the torque current component and a value of the torque current component of the current detected by the detector becomes smaller, and
   wherein the target value of the torque current component is set so that a deviation between the rotational phase determined by the phase determiner and a command phase representing a target phase of the rotational phase of the rotor becomes smaller.

10. The image forming apparatus according to claim 8, further comprising a speed determiner configured to determine a rotational speed of the rotor,
    wherein in the first control mode, the controller controls the current supplied to the coil so that a deviation between a target value of the torque current component and a value of the torque current component of the current detected by the detector becomes smaller, and
    wherein the target value of the torque current component is set so that a deviation between the rotational speed determined by the speed determiner and a command speed representing a target speed of the rotational speed of the rotor becomes smaller.

11. The image forming apparatus according to claim 1, further comprising:
    a photosensitive drum as the first member, the photosensitive drum including a photosensitive member on an outer peripheral surface of the photosensitive drum;
    a developing unit configured to develop an electrostatic latent image formed on the photosensitive member;

a transfer belt as the second member, the image developed by the developing unit on the photosensitive member being transferred onto the transfer belt; and a transfer unit configured to transfer the image having been transferred onto the transfer belt onto the recording medium, wherein the first position is a position where the outer peripheral surface of the photosensitive drum and an outer peripheral surface of the transfer belt are in contact with each other, and wherein the second position is a position where the outer peripheral surface of the photosensitive drum and the outer peripheral surface of the transfer belt are separated from each other.

12. The image forming apparatus according to claim 1, further comprising:

a photosensitive drum including a photosensitive member on an outer peripheral surface of the photosensitive drum;

a developing unit configured to develop an electrostatic latent image formed on the photosensitive member;

a transfer belt as the second member, the image developed by the developing unit on the photosensitive member being transferred onto the transfer belt; and a transfer roller as the first member, the transfer roller being configured to transfer the image having been transferred onto the transfer belt onto the recording medium, wherein the first position is a position where an outer peripheral surface of the transfer roller and an outer peripheral surface of the transfer belt are in contact with each other, and wherein the second position is a position where the outer peripheral surface of the transfer roller and the outer peripheral surface of the transfer belt are separated from each other.

13. The image forming apparatus according to claim 1, further comprising:

a transfer unit configured to transfer the image onto the recording medium; and a fixing unit including a first rotary member as the first member and a second rotary member as the second member, the first rotary member and the second rotary member forming a nip portion, the fixing unit being configured to fix the image having been transferred onto the recording medium by the transfer unit onto the recording medium by heat at the nip portion, wherein the first position is a position where an outer peripheral surface of the first rotary member and an outer peripheral surface of the second rotary member are in contact with each other, and wherein the second position is a position where the outer peripheral surface of the first rotary member and the outer peripheral surface of the second rotary member are separated from each other.

14. The image forming apparatus according to claim 1, wherein the motor is a brushless direct current (DC) motor.

* * * * *